June 24, 1958  D. E. PARSONS  2,840,110
POSITIVE ACTION BUILD-UP AND VENT VALVE
Filed March 15, 1955  2 Sheets-Sheet 1

INVENTOR.
DARRELL E. PARSONS
BY Nicholas J. Garofalo
ATTORNEY

June 24, 1958 D. E. PARSONS 2,840,110
POSITIVE ACTION BUILD-UP AND VENT VALVE
Filed March 15, 1955 2 Sheets-Sheet 2
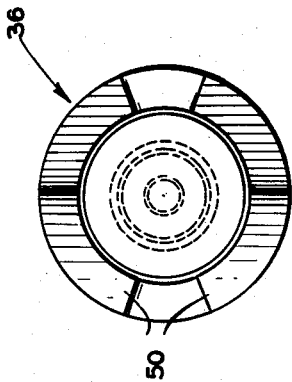
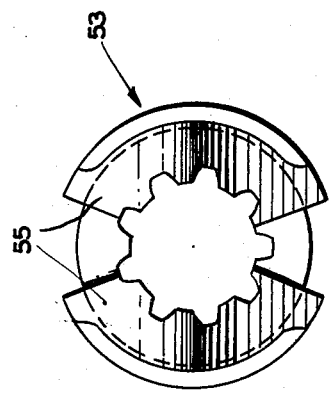
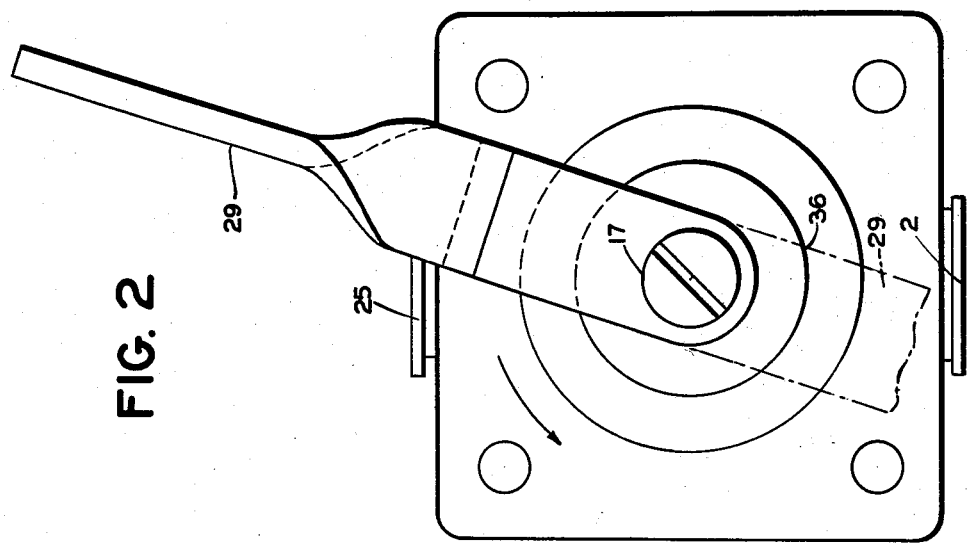
INVENTOR.
DARRELL E. PARSONS
BY Nicholas J. Garofalo
ATTORNEY

United States Patent Office 2,840,110
Patented June 24, 1958

2,840,110

POSITIVE ACTION BUILD-UP AND VENT VALVE

Darrell E. Parsons, Davenport, Iowa, assignor to Bendix Aviation Corporation, Teterboro, N. J., a corporation of Delaware Application March 15, 1955, Serial No. 494,483

3 Claims. (Cl. 137—625.27)

This invention pertains to a novel and improved type of fluid venting valve which, though subject to wide application, finds particular use in liquid oxygen systems. The general function of the valve is to vent a liquid oxygen system to atmosphere while the system is being filled with liquid oxygen, thereby preventing undesirable pressure build-up in the system.

A general object of the invention is a novel and improved type of combined venting and distributing valve for the foregoing purposes.

The valve embodying the invention is of a two position type, wherein one position the liquid oxygen system is vented as it is being filled, and in the other position, the system is opened for gas distribution.

A feature of the invention is a lever arrangement for shifting the valve from one of two positions to the other and holding the valve in its moved position assuring valve closure.

The invention further lies in the novel structure and arrangement of the various elements of the devicce in which the invention is embodied, as well as in the cooperative association of the various elements thereof with one another to produce the results intended.

The foregoing and other objects and advantages of the invention will appear more fully hereinafter from a consideration of the detailed description which follows, taken in conjunction with the accompanying drawings wherein one embodiment of the invention is illustrated by way of example. It is to be expressly understood, however, that the drawings are for purposes of illustration and description only, and are not intended as a definition of the limits of the invention.

Referring to the drawings:

Fig. 2 is a right end view;

Fig. 3 is a plan view of the cam face of a cam member; and

Fig. 4 is a plan view of the cam face of a complementary cam member.

Figure 1:
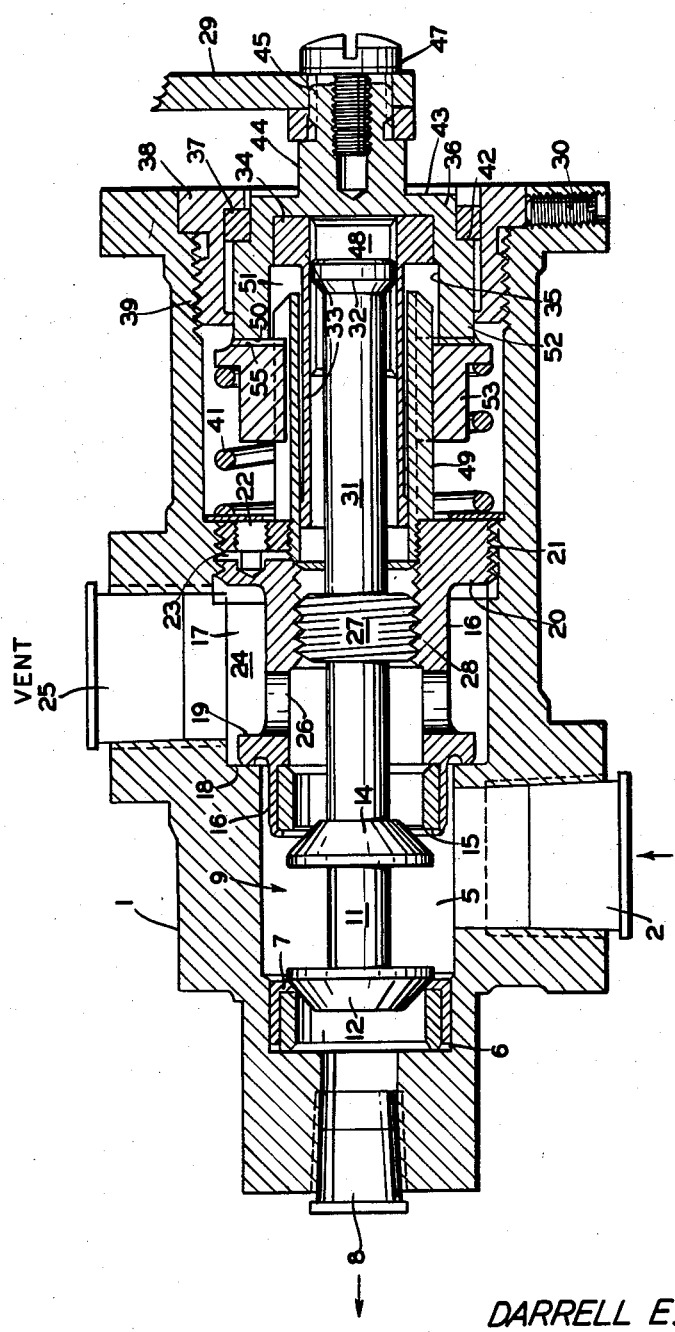
Fig. 1 is a longitudinal section through a combined venting and distributing valve embodying the invention.

In the drawings there is shown an elongated valve housing 1 in which the mechanism of the valve is housed. In the side of the housing body is an inlet 2 that is adapted to connect with an outlet line of a liquid oxygen system such as the supply tank, not shown. Inlet 2 communicates with a chamber 5. The latter has an annular shoulder 6 at one end on which is fitted a suitable valve seat 7, through which seat chamber 5 communicates with a distribution outlet passage 8 extending to an end of the housing. A valve member, generally designated 9, carries an elongated rod or stem 11 which is disposed axially of the valve housing. A conical valve head 12 at one end of valve stem 11 is adapted when the stem is shifted in one direction to engage with seat 7 to block fluid in inlet 2 from passing to the distribution passage 8. A second conical valve head 14, carried by stem 11 in spaced relation to head 12, is adapted, when stem 11 is shifted in the opposite direction, to engage a seat 15 at the opposite end of chamber 5. Seat 15 is formed in an end of an elongated cylindrical hollow piece 16 which is supported axially of the housing in a second chamber 17 adjacent to chamber 5. An annular shoulder 18 is provided where chamber 5 connects with the larger chamber 17. An end of member 16 forming seat 15 projects a little way into chamber 5. A flange 19 extending about member 16 forms a stop engaging the shoulder 18. A second and thickened flange 20 at the opposite end of member 16 is threadedly engaged, as at 21, with the interior wall of the housing. It is threaded therein so as to bring the end wall of flange 19 into sealing contact with shoulder 18. A set screw 22, cooperable with a radially slotted portion 23 of flange 20, serves to freeze or lock the cooperating threaded portion of housing and flange 20 together, whereby the position of member 16 is fixed. A well 24, provided between the flange members 19 and 20 of element 16, communicates with a vent 25 opening to atmosphere through the side wall of the housing. Member 16 is axially hollow, and a plurality of radial holes 26 through the wall thereof connect the well 24 and vent 25 through the seat opening 15 with the chamber 5. It can be seen that as the valve stem 11 is moved axially in one direction, valve head 12 will seal the distribution outlet 8, and valve head 14 will be moved from seat 15 to vent inlet passage 2 to atmosphere; and as the stem is moved in the opposite direction, head 14 will seal the vent seat 15 and head 12 will move away from the distribution valve seat 7.

Valve stem 11 is provided with an externally threaded collar or screw portion 27 about midway thereof which screws in a complementary internally threaded portion 28 of member 16, whereby valve heads 12 and 14 are shifted to and from their respective seats.

Means operable by a manual lever 29 is employed to turn the the valve stem in one direction or the other. To this end, an extension 31 of valve stem 11 beyond the screw collar 27 is terminated by a splined head 32, which head is slidable in a complementary splined sleeve 33. The latter carries a peripheral end flange 34 that is fixed in the recess 35 of a cup member 36. The latter is supported for rotatable and slidable movement in a bearing ring 37 that is retained in the housing by a bearing block 38. The bearing block has a threaded skirt portion 39 that engages in a complementary threaded portion of the housing and is locked in place by a set screw 30. Spring means 41 constantly urges cup member 36 in a direction to the right (Fig. 1). The latter is limited in this directional movement by a shoulder 42 thereof that is adapted to abut against bearing ring 37. The wall 43 at the right end of the cup member has a reduced extension or boss 44 that projects out of the bearing block 37 to the outside of the housing. A closely splined end portion 45 of member 44 engages a complementary splined end portion of the radially extending lever 29. Lock nut and washer elements 47 secure the position of the lever.

The valve is illustrated in vented position in Figs. 1, 2. In this position of the valve stem, a travel space 48 exists between the right end 32 of the stem and the end of sleeve 33 to allow for travel of the stem to the right.

Suitable means is provided to indicate to the operator of the device when the distribution valve 12 is positively closed and the vent valve is open, and vice versa. This means includes an elongated hollow member 49. The latter threads at its inner end into the right end of member 16 and surrounds sleeve 33. The latter is slidable in the interior of member 49. The extent to which sleeve 33 may slide in member 49 is limited by a short space 51 separating the end of member 49 from the flange 34 of the sleeve member. Member 49 is splined in its periphery. A skirt portion 52 of cup member 36 freely surrounds an end part of splined member 49. Splined for slidable movement along member 49 is a cam collar 53, The latter includes a double lobed cam face 55 at one end which mates with a complementarily cammed face 50 in the end wall of the skirt portion 52 of member 36. Coil spring 41 constantly urges the opposed cam faces into engagement with one another. The cam faces (Figs. 3, 4) are double lobed so as to provide at least two mating positions about 180° apart. The spacing of the lobes and the valleys between the lobes is such that, when member 36 is turned a full cam lobe space, the valve heads 12, 14 are carried from one position to the opposite. The lever 29 is adjusted on the splined extension 44 so that when it is in the full line position (Fig. 2) the cam faces will be mated and the valve heads 12, 14 will be in the Fig. 1 position wherein the distribution valve is closed and the vent valve is opened; and when the lever is in the broken line position, the cam faces will be mated in a reverse position and the vent valve will be closed and the other valve opened. By this arrangement, it is clear that as lever 29 is turned from one position to the other, the high points of the lobes of the cam face of member 36 will move from the valleys of cam member 53 and over the adjacent high points or cam lobes of the latter to a reverse position in the cam valleys. It is clear also, that unless lever 29 is turned sufficiently to carry the high points of cam member 36 fully over those of member 53, the spring load will restore member 36 to its last position before moving. It is further clear that as the high points of the cam face of member 53 are passed by those of member 36, the spring load 41 will assist the cam member 36 in moving to its next mating valley position. By this arrangement a positive assurance as to the condition of the valve is provided for the operator.

While an embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art, and it is my intent, therefore, to claim the invention not only as shown and described, but also in all such forms and modifications as may be reasonably construed to be within the spirit of the invention and the scope of the appended claims.

What is claimed is:

1. A valve comprising a housing, a valve seat, an elongated valve stem threaded in the housing for axial movement, a valve head on the stem movable into and out of engagement with the seat by axial movement of the stem, a sleeve member splined for axial movement on an end portion of the valve stem, a lever mounted on and extending radially from the sleeve member externally of the housing for turning the sleeve member and the associated valve stem together in either direction, bearing means in the housing engaging the sleeve member, said sleeve member having an annular shoulder at the outer end thereof butting against said bearing means, arranged to restrain outward axial movement of the sleeve member, a fixed elongated hollow member mounted on the housing in axial alignment with the sleeve member, a collar splined for axial movement on the hollow member and having a cam end face arranged to mate with a complementary cam end face on the sleeve member, and spring means bearing against the collar arranged to bias the cam face of the collar against the sleeve member, thereby biasing the shoulder of the sleeve member against the bearing means.

2. A valve as claimed in claim 1 wherein the opposed cam faces have at least two mating positions, arranged for shifting the sleeve member and valve stem between closed and open valve positions corresponding to said mating positions by operation of the lever.

3. A valve comprising, a housing, a valve seat, a valve head engageable with said seat, means for moving said head into and out of engagement with said seat including an axially movable valve stem, a guide member fixed to said housing and encircling said stem, means for moving the stem axially between open and closed valve positions by rotation of said stem including a sleeve member interposed between said guide member and stem and rotatively mounted in said housing, said sleeve member slidably engaging the stem and the fixed guide member, a detent member slidably mounted on said guide member and engaging the sleeve member, and spring means in the housing engaging the detent member for biasing said member against the sleeve member.

References Cited in the file of this patent

UNITED STATES PATENTS

| | | |
|---|---|---|
| 1,224,090 | Lavigne | Apr. 24, 1917 |
| 1,326,938 | Knudsen | Jan. 6, 1920 |
| 1,484,378 | Nell | Feb. 19, 1924 |
| 2,260,523 | Henry | Oct. 28, 1941 |
| 2,610,024 | Wirth | Sept. 9, 1952 |

FOREIGN PATENTS

| | | |
|---|---|---|
| 927,166 | France | of 1947 |